US012785439B2

(12) United States Patent
Cheng et al.

(10) Patent No.: US 12,785,439 B2
(45) Date of Patent: Nov. 3, 2026

(54) POWER SUPPLY SYSTEM AND CONTROL METHOD

(71) Applicant: DELTA ELECTRONICS, INC., Taoyuan City (TW)

(72) Inventors: Hsieh-Hsiung Cheng, Taoyuan City (TW); Te-Chih Peng, Taoyuan City (TW); Ming-Hsiang Lo, Taoyuan City (TW); Kuo-Hsun Chien, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 40 days.

(21) Appl. No.: 18/770,668

(22) Filed: Jul. 12, 2024

(65) Prior Publication Data

US 2025/0023383 A1 Jan. 16, 2025

Related U.S. Application Data

(60) Provisional application No. 63/513,355, filed on Jul. 13, 2023.

(30) Foreign Application Priority Data

May 9, 2024 (CN) ........................ 202410568276.3

(51) Int. Cl.
*H02J 9/06* (2006.01)
*G06F 1/26* (2006.01)
*H02J 1/102* (2026.01)

(52) U.S. Cl.
CPC .............. *H02J 9/061* (2013.01); *G06F 1/263* (2013.01); *H02J 1/102* (2013.01)

(58) Field of Classification Search
CPC .... H02J 9/061; H02J 1/102; H02J 9/04; H02J 9/005; G06F 1/263
See application file for complete search history.

(56) References Cited

U.S. PATENT DOCUMENTS

| | | | |
|---|---|---|---|
| 7,274,112 | B2 | 9/2007 | Hjort et al. |
| 9,785,127 | B2 | 10/2017 | Park |

(Continued)

FOREIGN PATENT DOCUMENTS

| | | | |
|---|---|---|---|
| CN | 115275967 | A | 11/2022 |
| EP | 2296251 | A2 | 3/2011 |

(Continued)

*Primary Examiner* — Rexford N Barnie
*Assistant Examiner* — Rasem Mourad
(74) *Attorney, Agent, or Firm* — CKC & Partners Co., LLC

(57) ABSTRACT

A control method applied to a power supply system. The power supply system comprises at least one first power unit and a second power unit, and the at least one first power unit is configured to provide power to an electrical load according to a power provided by a power source. The control method comprises: detecting a load status of the power supply system; when the load status is determined to be a peak load, generating a trigger signal; and in response to the trigger signal, disabling a first-stage converter in the second power unit, and controlling an energy storage capacitor in the second power unit to provide power to the electrical load, wherein the energy storage capacitor is coupled between the first-stage converter and a second-stage converter in the second power unit.

20 Claims, 11 Drawing Sheets

(56) References Cited

U.S. PATENT DOCUMENTS

| | | | | |
|---|---|---|---|---|
| 10,238,000 | B2 | 3/2019 | Sarti | |
| 10,778,025 | B2 | 9/2020 | Gazit | |
| 11,068,038 | B2 | 7/2021 | Muccini et al. | |
| 11,075,540 | B2 | 7/2021 | Shigeta | |
| 11,128,210 | B2 | 9/2021 | Li et al. | |
| 11,527,964 | B2 | 12/2022 | Naiknaware et al. | |
| 2010/0045107 | A1* | 2/2010 | Cohen | H02J 9/062 307/23 |
| 2010/0219769 | A1* | 9/2010 | Matsumura | A61B 5/157 315/291 |
| 2011/0064445 | A1* | 3/2011 | Yashiro | G03G 15/5004 399/88 |
| 2012/0026764 | A1* | 2/2012 | Giuntini | H02J 9/005 363/69 |
| 2014/0175886 | A1* | 6/2014 | Kwok | H02J 3/32 307/46 |
| 2015/0015068 | A1* | 1/2015 | Chang | H02J 9/00 307/22 |
| 2017/0163088 | A1* | 6/2017 | Toyoda | H02J 9/02 |
| 2017/0288406 | A1 | 10/2017 | Chisenga et al. | |
| 2021/0089106 | A1* | 3/2021 | Muccini | G06F 1/30 |
| 2022/0224149 | A1* | 7/2022 | Colombi | H02J 9/062 |

FOREIGN PATENT DOCUMENTS

| | | | |
|---|---|---|---|
| TW | I292976 | B | 1/2008 |
| TW | 201709632 | A | 3/2017 |
| TW | I805139 | B | 6/2023 |

* cited by examiner

400

POWER SUPPLY SYSTEM AND CONTROL METHOD

CROSS-REFERENCE TO RELATED APPLICATION

This application claims priority to U.S. Provisional Application Ser. No. 63/513,355 filed Jul. 13, 2023, and China Application Serial Number 202410568276.3, filed May 9, 2024, the disclosures of which are incorporated herein by reference in their entireties.

BACKGROUND

Technical Field

The present disclosure relates to power supply technology, particularly a power supply system and a control method.

Description of Related Art

With the rapid development of economy and industry, power supply systems are becoming increasingly important. Generally speaking, most industrial equipment is driven by direct current (DC) power. Therefore, a conversion device is required between a power distribution system and equipments to convert the alternating current (AC) power provided by the power grid into DC power, and whether power can remain stable during the transmission and conversion process is one of the important performance indicators of the power supply system.

SUMMARY

One aspect of the present disclosure is a power supply system, comprising at least one first power unit and a second power unit. The first power unit is coupled between a power source and an electrical load to provide power to the electrical load. The second power unit is coupled in parallel to the at least one first power unit, and is coupled between the power source and the electrical load. The second power unit comprises an energy storage capacitor, a first-stage converter, a second-stage converter and a processor. The first-stage converter is coupled between the power source and the energy storage capacitor. The second-stage converter is coupled between the energy storage capacitor and the electrical load. The processor is coupled to the first-stage converter and the second-stage converter. When the second power unit is in a standby mode, the processor is configured to switch the second power unit to a power supply mode according to a trigger signal. When the second power unit is in the power supply mode, the processor is configured to disable the first-stage converter, and the energy storage capacitor is configured to provide power to the electrical load by the second-stage converter.

Another aspect of the present disclosure is a control method applied to a power supply system. The power supply system comprises at least one first power unit and a second power unit, and the at least one first power unit is configured to provide power to an electrical load according to a power provided by a power source. The control method comprises: detecting a load status of the power supply system; when the load status is determined to be a peak load, generating a trigger signal; and in response to the trigger signal, disabling a first-stage converter in the second power unit, and controlling an energy storage capacitor in the second power unit to provide power to the electrical load, wherein the energy storage capacitor is coupled between the first-stage converter and a second-stage converter in the second power unit.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1A:
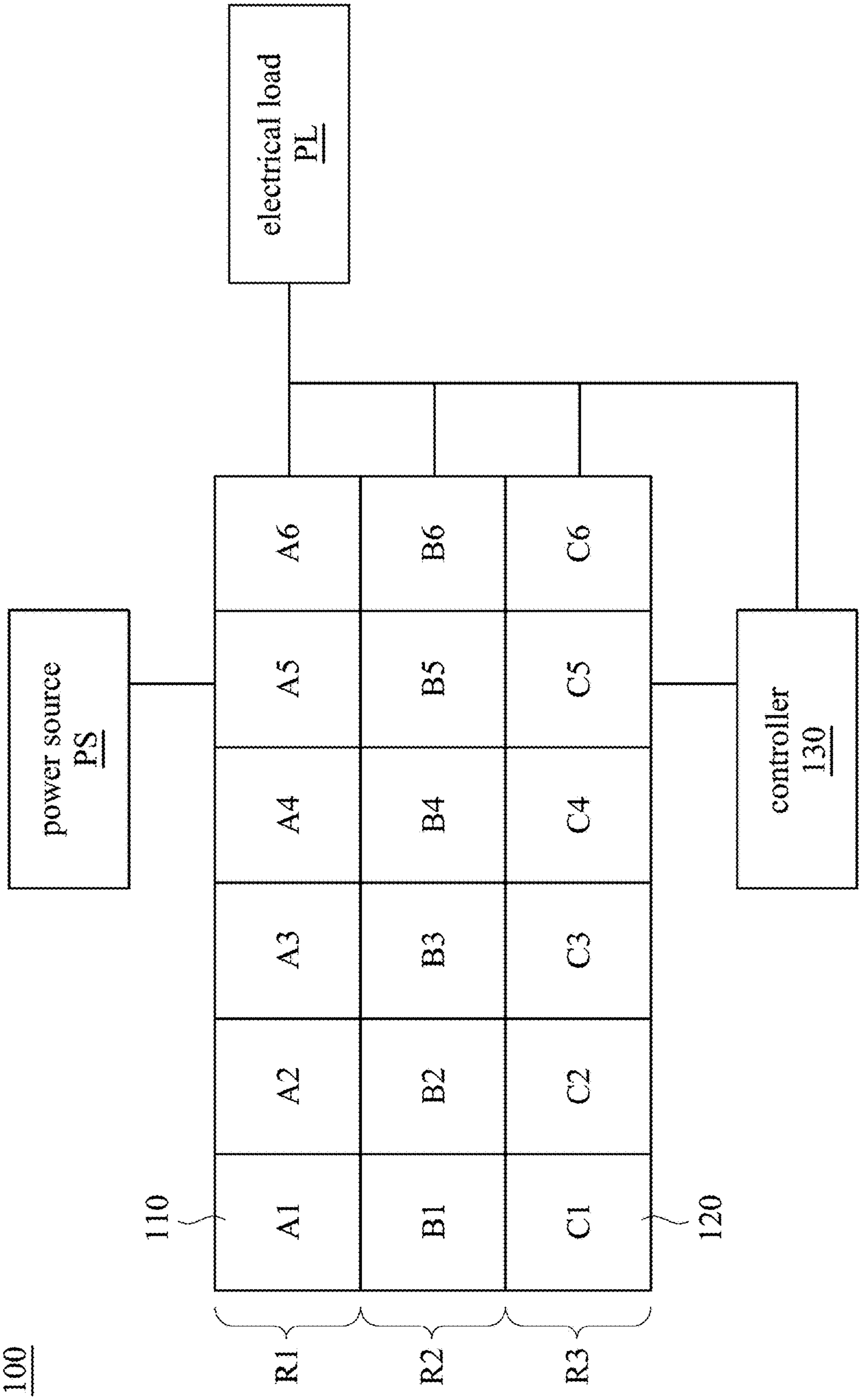
FIG. 1A is a schematic diagram of a power supply system in some embodiments of the present disclosure.

FIG. 1A is a schematic diagram of a power supply system 100 in some embodiments of the present disclosure. In one embodiment, the power supply system 100 includes multiple power units A1-A6, B1-B6 and C1-C6. The power units A1-A6, B1-B6 and C1-C6 are coupled between a power source PS (e.g., power grid) and an electrical load PL (e.g., machine or equipment).

In one embodiment, the power units A1-A3, B1-B3 and C1-C3 can each be a three-phase power supply unit, which corresponds to three phases labeled U, V, and W. The power units A4-A6, B4-B6 and C4-C6 can each be another three-phase power supply unit corresponding to three phases labeled U, V, and W. However, the present disclosure is not limited to this, in some other embodiments, each of the power units may also be a single-phase power supply unit.

Each of the power units A1-A6, B1-B6 and C1-C6 can be a power supply unit, a power conversion circuit or a similar converter. In one embodiment, the power unit has an AC-DC conversion circuit to convert an AC power provided by the power source PS into a DC power of appropriate voltage, and provide the DC power to the electrical load PL. Since one of ordinary skill in the art can understand circuits and principles of the power supply unit, it will not be described in detail here.

In addition, according to a configuration of the power supply system 100 (e.g., arrangement or setup of a cabinet), the power units A1-A6, B1-B6 and C1-C6 can be divided into different rows R1-R3. In one embodiment, the power units A1-A6 of the first row R1 and the power units B1-B6 of the second row R2 are normal operating power supply units, and the power units C1-C6 of the third row R3 are redundant power supply units. In other words, when the power supply system 100 is in a normal load status, the power units A1-A6 and B1-B6 provide/supply power to the electrical load PL according to the power provided by the power source PS. When the power supply system 100 operates in a peak load status due to a power supply requirement increase, the power units C1-C6 activate in response to the trigger signal. The detailed operation method will be detailed in the subsequent paragraphs.

It is important to mention here that the arrangement of the redundant power supply can be adjusted according to actual needs and are not limited to the configuration shown in FIG. 1A. For example, in another embodiment, the power units C1-C3 may be redundant power supply units, and the power units C4-C6 may be a normally operating power supply units. In some other embodiments, the power units A1-A6 can be configured as the redundant power supply units, and other power units can be configured as normal operating power supply units. For the convenience of explanation, the normally operating power supply unit is called "first power unit 110", and the redundant power supply unit is called "second power unit 120".

Figure 1B:
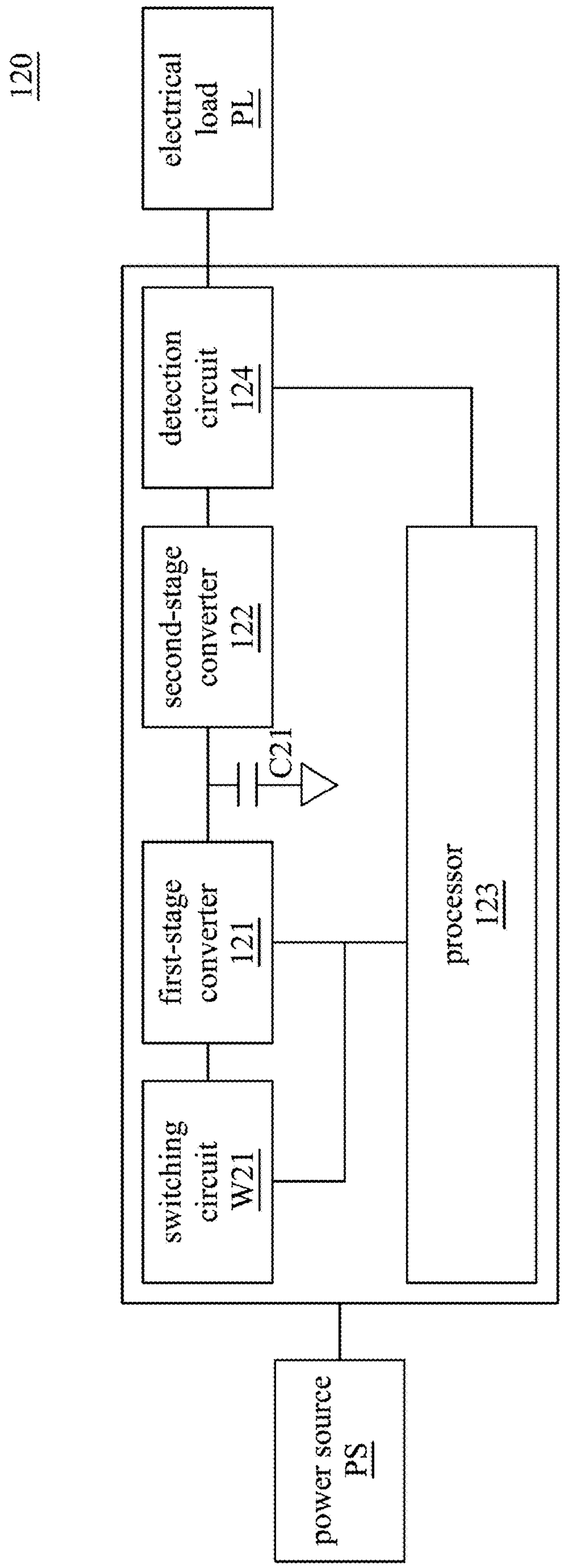
FIG. 1B is a schematic diagram of a second power unit in some embodiments of the present disclosure.

FIG. 1B is a schematic diagram of a second power unit 120 in some embodiments of the present disclosure. The second power unit 120 is coupled in parallel to the first power unit(s) 110. In one embodiment, the second power unit 120 includes a first-stage converter 121, a second-stage converter 122, a processor 123 and an energy storage capacitor C21. The first-stage converter 121 is coupled between the power source PS and the energy storage capacitor C21. In addition, according to the type of the power source PS (e.g., providing AC or DC), the first-stage converter 121 can be an AC-DC conversion circuit, or a DC-DC conversion circuit.

The second-stage converter 122 is coupled between the energy storage capacitor C21 and the electrical load PL. One terminal of the energy storage capacitor C21 is coupled between the first-stage converter 121 and the second-stage converter 122, and the other terminal is coupled to a reference potential (e.g., ground).

The processor 123 is coupled to the first-stage converter 121 and the second-stage converter 122, and control the second power unit 120 to be in a "standby mode" or a "power supply mode". When the power supply system 100 is in the normal load status (i.e., the power required by the electrical load PL is within an normal range), the second power unit 120 operates in the standby mode. Since power provided by the first power units 110 is sufficient to meet the requirement of the electrical load PL, the processor 123 controls the energy storage capacitor C21 not to discharge, and controls the second power unit 120 not to provide power to the electrical load PL or controls a power supply power of the second power unit 120 is less than a preset value (e.g., an extremely low power). Since one of ordinary skill in the art can understand the method of controlling the power supply power of the second-stage converter, it will not be described in detail here.

As mentioned above, when the power supply system 100 operates in a peak load status, and the power provided by the first power units 110 is not sufficient to meet the requirement of the electrical load PL, the second power unit 120 receives a trigger signal, and is switched from the standby mode to the power supply mode accordingly. At this time, the processor 123 disables the first-stage converter 121, and causes the energy storage capacitor C21 to discharge, so as to provide power to the electrical load PL by the second-stage converters 122 to share the required output current during the peak load. This function is called "current sharing".

In some embodiments, the second power unit 120 further includes a switching circuit W21. The switching circuit W21 is coupled to the first-stage converter 121, so that the first-stage converter 121 is coupled to the power source PS through the switching circuit W21. The processor 123 is configured to control the switching circuit W21 to turn on or off, so as to enable or disable the first-stage converter 121. In some other embodiments, the processor 123 can also control a switch in the first-stage converter 121 directly to enable or disable the first-stage converter 121. Similarly, the processor 123 can also control the second-stage converter 122 in the same manner.

Accordingly, when the electrical load PL requires more power from the power supply system 100, the power supply system 100 can activate the second power unit(s) 120, so as to output power through the energy pre-stored in the energy storage capacitor C21 to meet the additional power supply requirements. Since the second power unit 120 is powered by internal power (from the energy storage capacitor C21) in the power supply mode, and does not need to require more current from the power source PS, it can avoid a problem that the power supply system 100 generates a current surge, causing damage to the internal components of the power supply system 100.

In one embodiment, the circuit structure of the first power unit 110 may be the same as the circuit structure of the second power unit 120. In another embodiment, the first power unit 110 includes the first-stage converter 121 and the second-stage converter 122 shown in FIG. 1B, and also includes the energy storage capacitor C21, but does not include the switching circuit W21. Since one of ordinary skill in the art can understand the various implementations of the power unit, it will not be described in detail here.

Figure 2A:
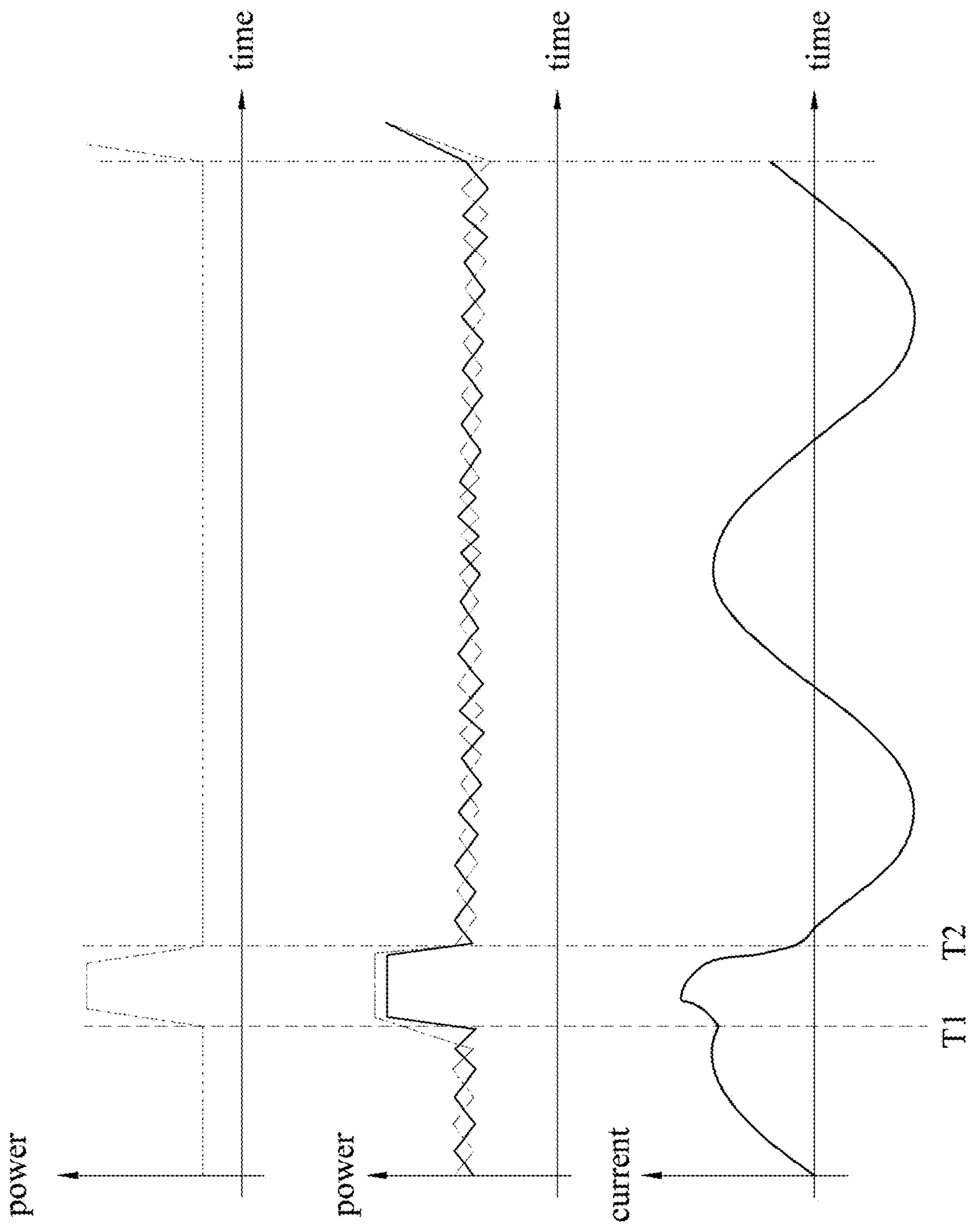
FIGS. 2A-2C are schematic diagrams of the load status and current status of the power supply system in some embodiments of the present disclosure.
Figure 2B:
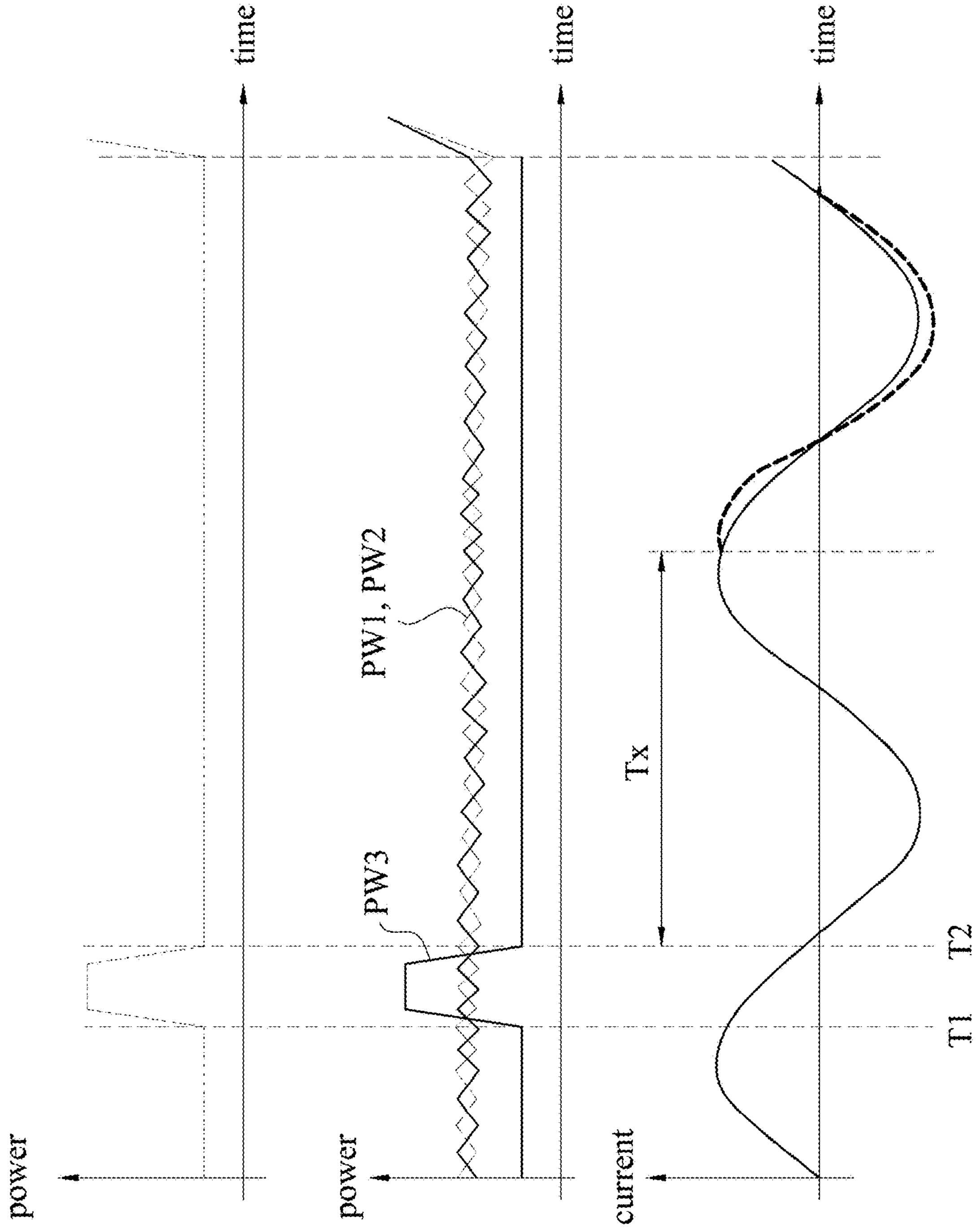
Figure 2C:
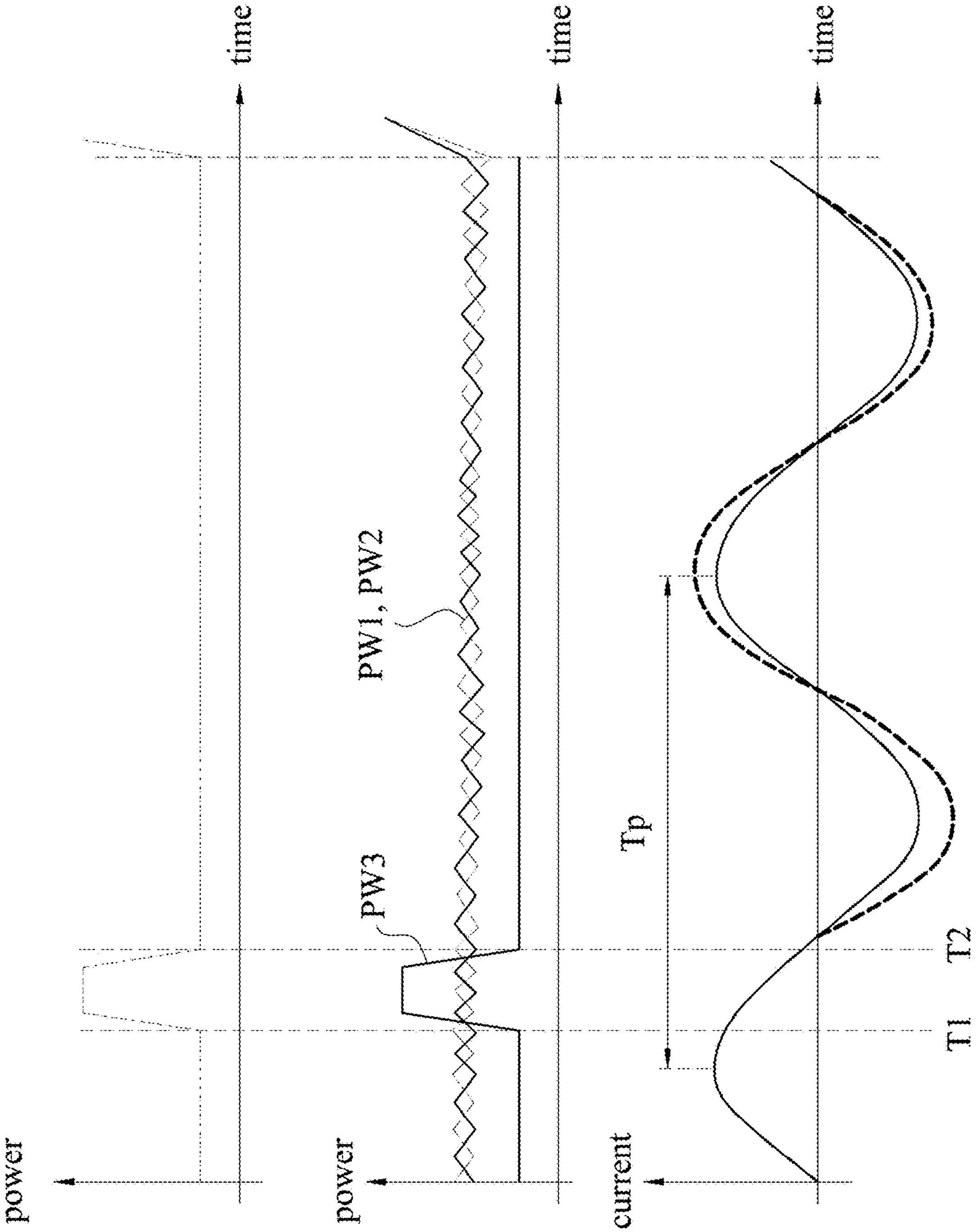

FIGS. 2A-2C are schematic diagrams of the load status and current status of the power supply system in some embodiments of the present disclosure, wherein FIG. 2A is a schematic diagram without a redundant power supply (the second power unit 120). As shown in FIG. 2A, the first waveform is a required power of the electrical load PL, the second waveform is an operating power of each power unit, and the third waveform is a waveform of a current provided by the power source PS to the power supply systems 100. As shown in figure, during the period from time point T1 to T2, the required power of the electrical load PL suddenly increases, which belongs to the "peak load". In order to increase the output power, the first power units 110 will increase the operating power. However, this operation will require more current from the power source PS. As shown in the current waveform in FIG. 2A, at this time, a current surge will occur, which may cause damage to the components in the power supply system 100.

FIG. 2B is a schematic diagram of the power supply system 100 having the second power unit 120 as a redundant power supply in one embodiment of the present disclosure. As shown in the second waveform diagram of FIG. 2B, under the normal load status, the power supply system 100 outputs power only through the first power units 110, while the second power unit 120 remains in the standby mode. In the standby mode, the second power units 120 does not provide power, or the power supply power is much less than the first power units 110 (as shown in FIG. 2B, the curve PW3 is much less than curves PW1 and PW2). At the period from time points T1-T2, when the power supply system 100 operates in the peak load, the second power unit 120 is started to supply power to the electrical load PL through the energy storage capacitor C21. Accordingly, it will be no current surges between the power source PS and the first power units 110 and the second power unit 120, and the power supply requirement of the peak load can be met.

As shown in FIG. 2B, in one embodiment, when the second power unit 120 provides power to the electrical load PL by the energy storage capacitor C21 and the second-stage converter 122, if the processor 123 receives the standby signal, it means that the load status of the power supply system 100 has returned to "normal load". At this time, the processor 123 controls the energy storage capacitor C21 to stop discharging, so that the second power unit 120 returns/resumes to the standby mode. In some embodiments, the processor 123 enables the first-stage converter 121 or turns on the switching circuit W21, so as to change to charge the energy storage capacitor C21 according to the power provided by the power source PS. In addition, the processor 123 can disable the second-stage converter 122 at the same time, or change an operating frequency of the second-stage converter 122, so as to ensure that the second power unit 120 returns/resumes the standby mode.

After the second power unit 120 resumes the standby mode, the processor 123 controls the energy storage capacitor C21 to stop discharging (e.g., disable or change an operating status of the second-stage converter 122). At the same time, the processor 123 starts counting, when the second-stage converter 122 resumes the standby mode and after a reset time Tx (e.g., a power supply period), the processor 123 enables the first-stage converter 121, and charges the energy storage capacitor C21 according to the power provided by the power source PS.

FIG. 2C is a schematic diagram of the power supply system 100 having the second power unit 120 as a redundant power supply in another embodiment of the present disclosure. The difference between FIG. 2C and FIG. 2B is "the charging method of the energy storage capacitor C21". In this embodiment, when the second power unit 120 resumes the standby mode, the processor 123 controls the energy storage capacitor C21 to stop discharging, and enables the first-stage converter 121, so as to charge the energy storage capacitor C21 according to the power provided by the power source PS during a charging time.

If the power source PS provides AC power, the charging time can be multiple power periods Tp. In other words, the processor 123 sets multiple subsequent power periods Tp as the charging time, so as to charge the energy storage capacitor C21 through the power provided by the power source PS. "The power period" is the current period during which the power source PS provides AC power to the power supply system 100 (as shown by a reference numeral Tp in FIG. 2C). On the other hand, if the power source PS provides DC power, the charging time can be a preset fixed time.

As mentioned above, in some embodiments, during a charging time (e.g., multiple power periods) after the second power unit 120 resumes the standby mode, the processor 123 controls a charging current to the energy storage capacitor C21. In other words, the processor 123 charges the energy storage capacitor C21 with a fixed/preset current value, and fully charges the energy storage capacitor C21 within the set charging time (e.g., three power periods).

As previously mentioned, the second power unit 120 enters to the standby mode and the power supply mode respectively in response to the standby signal and the trigger signal. In one embodiment, when the second power unit 120 has not received the trigger signal, the second power unit is in the standby mode. In the standby mode, the processor 123 enables the first-stage converter 121 to charge the energy storage capacitor C21 according to the power provided by the power source PS, so as to ensure that the energy storage capacitor C21 has enough power for use when the second power unit 120 is switched to the power supply mode.

Figure 3A:
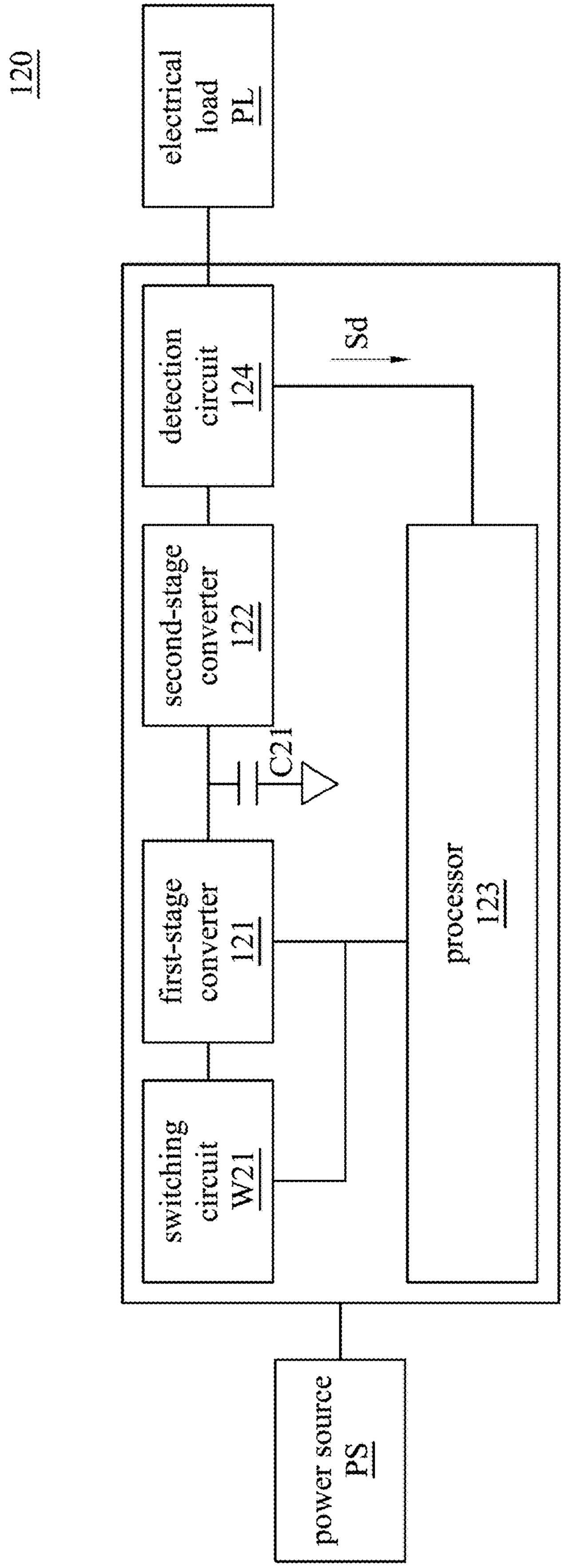
FIG. 3A is a schematic diagram of the second power unit of a power supply system in some embodiments of the present disclosure.

The following describes different ways of generating "the trigger signal" in multiple embodiments of the present disclosure. FIG. 3A is a schematic diagram of the second power unit 120 of the power supply system in some embodiments of the present disclosure. In one embodiment, the second power unit 120 further includes a detection circuit 124. The detection circuit 124 is coupled to the processor 123 and an output line of the second power unit 120. The detection circuit 124 is configured to detect an electrical signal on the output line of the second power unit 120 to obtain (e.g., determine or calculate) a slew rate of the first power unit. "The slew rate" can represent a load status of the power supply system 100.

As mentioned above, in one embodiment, the detection circuit 124 uses the detected slew rate as a detection signal Sd, and provide the detection signal Sd to the processor, so that the processor 123 can determine whether the slew rate is greater than a peak threshold. If the slew rate is greater than the peak threshold, it means that the power supply system 100 operates in the peak load status. At this time, the processor 123 will generate the trigger signal Sw autonomously. In some other embodiments, the detection circuit 124 determines whether the slew rate is greater than the peak threshold autonomously. If the slew rate is greater than the peak threshold, the detection circuit 124 generates the detection signal Sd, and transmits the detection signal Sd to the processor 123. In other words, the detection signal Sd can be used as the trigger signal Sw.

Figure 3B:
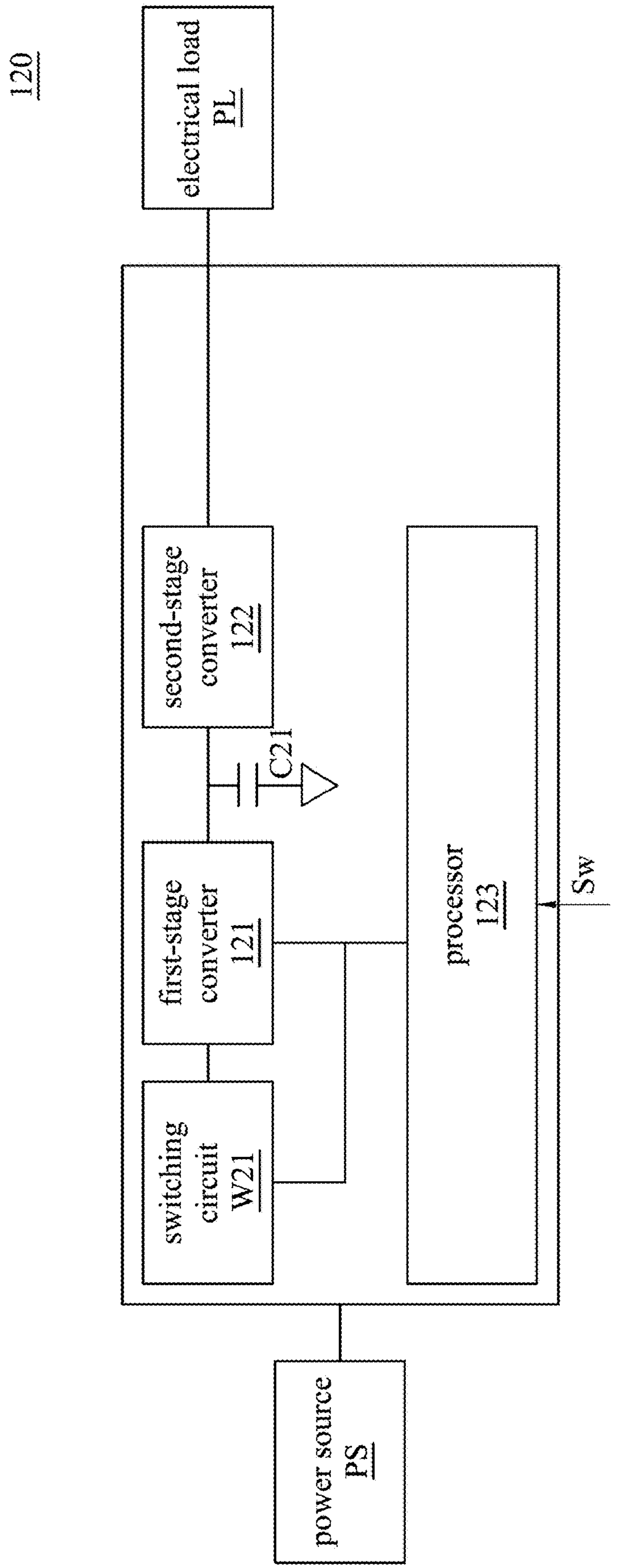
FIG. 3B is a schematic diagram of the second power unit of a power supply system in some other embodiments of the present disclosure.

In some other embodiments, the trigger signal Sw can be generated according to an output current change or a load prediction signal of the first power units 110. Referring to FIG. 1A and FIG. 3B, FIG. 3B is a schematic diagram of the second power unit 120 of the power supply system in some other embodiments of the present disclosure. In this embodiment, the power supply system 100 further includes a controller 130 (as shown in FIG. 1A). The controller 130 is respectively coupled to the first power units 110, the second power unit 120 and the electrical load PL, and is configured to obtain an output current change of the first power units 110 (e.g., by detecting the output line of the first power units 110) or obtain a load prediction signal (e.g., by detecting the signal input to the electrical load PL), so as to generate the trigger signal Sw, and provided the trigger signal Sw to the processor 123 of the second power unit 120.

As mentioned above, as shown in FIG. 1A, when the power supply system 100 provides power to the electrical load PL, the power supply system 100 uses a power information of the output power as the detection signal Sd, and feedbacks the detection signal Sd to the power units 110/120, and/or provides the detection signal Sd to the controller 130. Therefore, the processor 123 of the second power unit 120 or the controller 130 determines the output current change of the first power units 110 by the detection signal Sd, so as to generate/obtain the trigger signal Sw.

In addition, in another embodiment, the controller 130 monitors the operating status of the electrical load PL to obtain the load prediction signal, and when the load prediction signal is greater than the preset value, the controller 130 provides the trigger signal Sw to the second power unit 120.

Figure 3C:
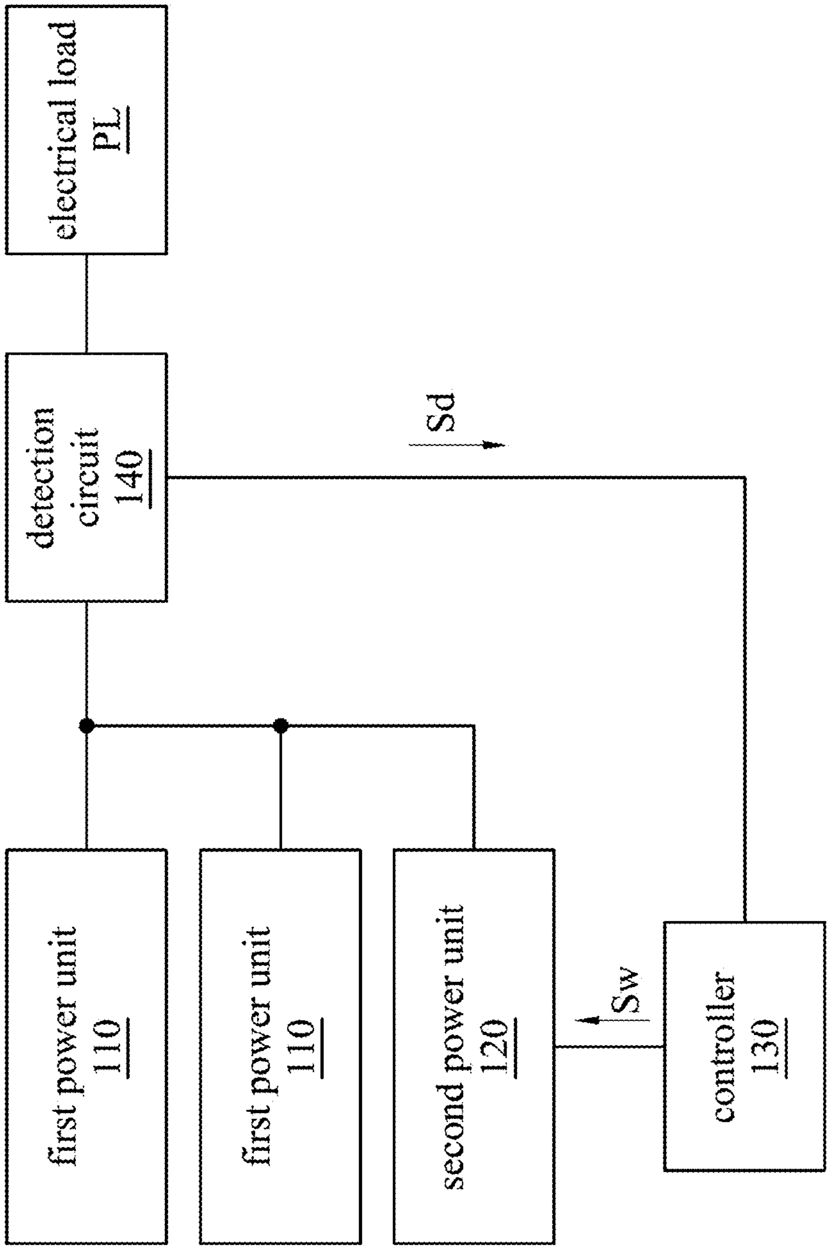
FIG. 3C is a schematic diagram of a power supply system in some embodiments of the present disclosure.

FIG. 3C is a schematic diagram of the power supply system in some embodiments of the present disclosure. In this embodiment, the power supply system 100 includes a detection circuit 140. The detection circuit 140 is coupled between the power units 110, 120 and the electrical load PL. The detection circuit 140 is configured to detect the slew rate of the first power units 110, and provides the detection signal Sd to the controller 130. The controller 130 determines whether the slew rate is greater than the peak threshold according to the detection signal Sd, and generates the trigger signal Sw to the second power unit 120.

Figure 3D:
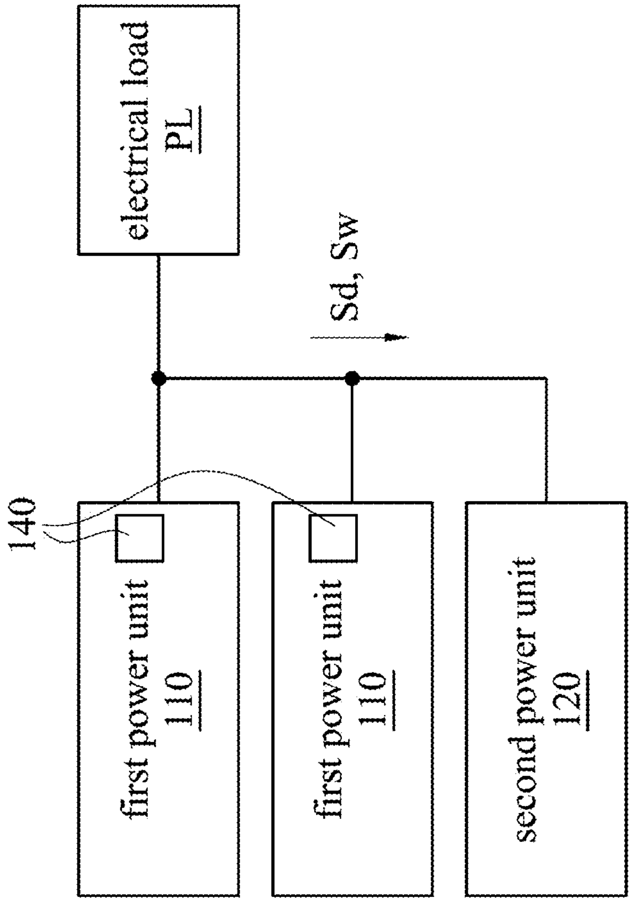
FIG. 3D is a schematic diagram of a power supply system in some other embodiments of the present disclosure.

FIG. 3D is a schematic diagram of the power supply system in some other embodiments of the present disclosure. In this embodiment, each of the first power units 110 includes a detection circuit 140. The detection circuit 140 is configured to detect the slew rate of the first power units 110 to generate the detection signal Sd. If the first power units 110 determines the slew rate is greater than the peak threshold (e.g., determining by an internal processor or the detection circuit), it means the power supply system 100 operates in the peak load status. At this time, the detection circuit 140 generates the trigger signal Sw to the second power unit 120.

In some other embodiments, the detection circuit 140 directly transmits the detection signal Sd to the second power unit 120. After receiving the detection signal Sd, the second power unit 120 determines whether the slew rate is greater than the peak threshold autonomously. If the slew rate is greater than the peak threshold, then the second power unit 120 generates the trigger signal Sw.

Figure 4:
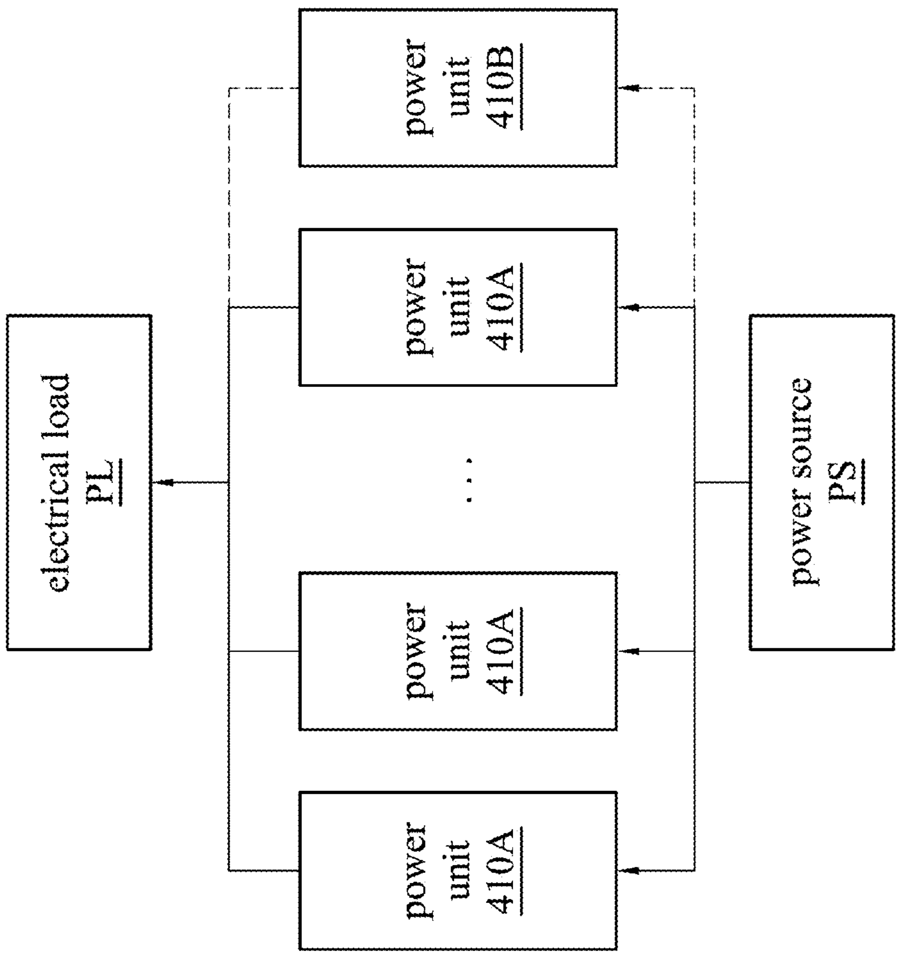
FIG. 4 is a schematic diagram of a power supply system in some other embodiments of the present disclosure.

FIG. 4 is a schematic diagram of a power supply system 400 in some other embodiments of the present disclosure. The power supply system 400 includes multiple power units 410A, 410B, and the power units 410A, 410B are connected in parallel with each other. In one embodiment, each of the power units 410A is a normally operating power supply units, and the power unit 410B is a redundant power supply unit. However, the number of the power units 410A and 410B can be adjusted according to actual needs.

Figure 5:
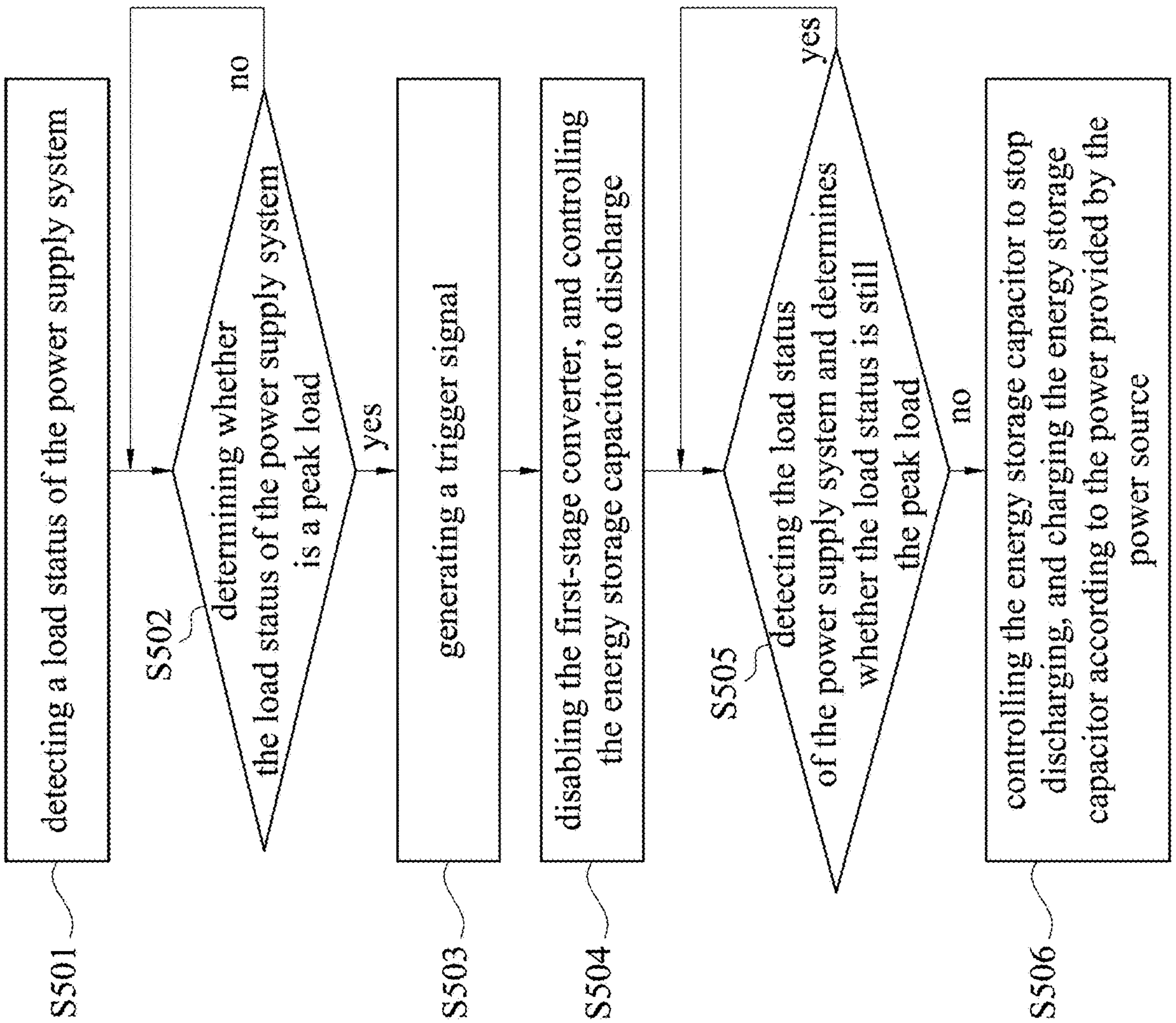
FIG. 5 is a flowchart illustrating a control method in some embodiments of the present disclosure.

FIG. 5 is a flowchart illustrating a control method in some embodiments of the present disclosure. Referring to FIGS. 1A, 1B and 5, in step S501, the power supply system 100 (e.g., the processor 123 or the controller 130) continuously monitors the load status of the power supply system 100.

In step S502, the power supply system 100 determines whether the load status is a peak load. If the load status is a nominal load, not the peak load, the second power unit 120 is maintained to the standby mode.

If the load status is the peak load, in step S503, the power supply system 100 generates the trigger signal Sw. As described in the previous embodiments, the trigger signal Sw is provided to the processor 123 of the second power unit 120 by the controller 130, or is provided to the processor 123 by the detection circuit 124, or is generated by the processor 123 according to the received detection signal Sd.

In step S504, in response to the trigger signal Sw, the second power unit 120 is switched from the standby mode to the power supply mode. At this time, the processor 123 disables the first-stage converter 121, and controls the energy storage capacitor C21 to discharge, so as to provide power to the electrical load PL.

In step S505, when the second power unit 120 is in the power supply mode, the power supply system 100 (e.g., the processor 123 or the controller 130) still continuously detects the load status of the power supply system 100 and determines whether the load status is still the peak load.

If the load status changed to the nominal load, in step S506, the power supply system 100 generates the standby signal, so that the second power unit 120 is switched from the power supply mode to the standby mode. Similar to the generation of the trigger signal Sw, the standby signal can be provided by the controller 130 to the processor 123 of the second power unit 120, or can be provided to the processor 123 by the detection circuit 124, or can be generated by the processor 123 according to the received detection signal Sd.

When the second power unit 120 is switched from the power supply mode to the standby mode, the processor 123 controls the energy storage capacitor C21 to stop discharging, and charges the energy storage capacitor according to the power provided by the power source PS. As mentioned above, in one embodiment, during charging the energy storage capacitor C21, the processor 123 can enable the first-stage converter 121 of the second power unit 120 to charge the energy storage capacitor C21 according to the power provided by the power source PS after counting a reset time. In some other embodiments, during charging the energy storage capacitor C21, the processor 123 controls the current value charging the energy storage capacitor C21 to a set current value, and charges the energy storage capacitor C21 evenly in a subsequent charging time (e.g., multiple power periods Tp).

Accordingly, by using the energy storage capacitor C21 of the redundant second power unit 120 for discharge, when the power supply system 100 operates in the peak load, there will be no need to obtain more current from the power source PS, but can directly supplement the required output power. Therefore, the power supply system 100 will not generate current surges when the power supply system 100 operates in the peak load, thereby ensuring the power supply stability and preventing internal components from being damaged by current surges.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A power supply system, comprising:

at least one first power unit coupled between a power source and an electrical load to provide power to the electrical load; and a second power unit coupled in parallel to the at least one first power unit, and coupled between the power source and the electrical load, wherein the second power unit comprises:

an energy storage capacitor;

a first-stage converter coupled between the power source and the energy storage capacitor;

a second-stage converter coupled between the energy storage capacitor and the electrical load; and a processor coupled to the first-stage converter and the second-stage converter;

wherein when the power supply system operates in a peak load status, the processor is configured to switch the second power unit from a standby mode to a power supply mode according to a trigger signal, wherein the peak load status corresponding to a sudden increase in load demand while the power source remains capable of supplying the electrical load;

wherein when the second power unit is in the power supply mode, the processor is configured to disable the first-stage converter, and the energy storage capacitor is configured to provide power to the electrical load by the second-stage converter.

2. The power supply system of claim 1, wherein before the processor receives the trigger signal, the processor is configured to enable the first-stage converter, and charge the energy storage capacitor according to a power provided by the power source.

3. The power supply system of claim 1, wherein when the energy storage capacitor provides power to the electrical load by the second-stage converter, and the processor receives a standby signal, the processor is configured to control the energy storage capacitor to stop discharging, so that the second power unit resumes the standby mode.

4. The power supply system of claim 3, wherein after the second power unit resumes the standby mode, the processor is configured to enable the first-stage converter after a reset time to change to charge the energy storage capacitor according to the power provided by the power source.

5. The power supply system of claim 3, wherein after the second power unit resumes the standby mode, the processor is configured to charge the energy storage capacitor according to the power provided by the power source in a subsequent plurality of power periods.

6. The power supply system of claim 5, wherein the second power unit uses a set current value to charge the energy storage capacitor.

7. The power supply system of claim 1, wherein when the second power unit is in the standby mode, the energy storage capacitor stops discharging, and the second power unit does not provide power to the electrical load or a power supply power of the second power unit is less than a preset value.

8. The power supply system of claim 1, wherein the second power unit further comprises:

a detection circuit coupled to the processor, configured to detect a slew rate of the at least one first power unit, and determine whether the slew rate is greater than a peak threshold.

9. The power supply system of claim 1, wherein the trigger signal is generated according to an output current change of the at least one first power unit or a load prediction signal.

10. The power supply system of claim 9, further comprising:

a controller coupled to the at least one first power unit, the second power unit and the electrical load, and configured to obtain the output current change of the at least one first power unit or the load prediction signal, so as to generate the trigger signal.

11. A control method applied to a power supply system, wherein the power supply system comprises at least one first power unit and a second power unit, and the at least one first power unit is configured to provide power to an electrical load according to a power provided by a power source, the control method comprises:

detecting a load status of the power supply system;

when the load status is determined to be a peak load status, generating a trigger signal, wherein the peak load status corresponding to a sudden increase in load demand while the power source remains capable of supplying the electrical load; and in response to the trigger signal, disabling a first-stage converter in the second power unit to switch the second power unit from a standby mode to a power supply mode, and controlling an energy storage capacitor in the second power unit to provide power to the electrical load, wherein the energy storage capacitor is coupled between the first-stage converter and a second-stage converter in the second power unit.

12. The control method of claim 11, further comprising:

when the load status is not determined to be the peak load status, enabling the first-stage converter, and charging to the energy storage capacitor according to the power provided by the power source.

13. The control method of claim 11, further comprising:

when the energy storage capacitor provides power to the electrical load, and the second power unit receives a standby signal, controlling the energy storage capacitor to stop discharging, so that the second power unit is switched from a power supply mode to a standby mode.

14. The control method of claim 13, further comprising:

when the second power unit is switched from the power supply mode to the standby mode, after a reset time, enabling the first-stage converter to change to charge the energy storage capacitor according to the power provided by the power source.

15. The control method of claim 13, further comprising:

when the second power unit is switched from the power supply mode to the standby mode, in a subsequent plurality of power periods, charging the energy storage capacitor according to the power provided by the power source.

16. The control method of claim 15, wherein charging the energy storage capacitor comprises:

In the subsequent plurality of power periods, using a set current value to charge the energy storage capacitor.

17. The control method of claim 13, wherein when the second power unit is in the standby mode, the energy storage capacitor stops discharging, and the second power unit does not provide power to the electrical load or a power supply power of the second power unit is less than a preset value.

18. The control method of claim 11, further comprising:

detecting, by a detection circuit, a slew rate of the at least one first power unit; and when the slew rate is greater than a peak threshold, generating the trigger signal.

19. The control method of claim 11, wherein the trigger signal is generated according to an output current change of the at least one first power unit or a load prediction signal.

20. The control method of claim 19, further comprising:

obtaining, by a controller, the output current change of the at least one first power unit or the load prediction signal, wherein the controller is coupled to the at least one first power unit, the second power unit and the electrical load.

* * * * *